United States Patent [19]

Pelanek et al.

[11] Patent Number: 5,724,582
[45] Date of Patent: Mar. 3, 1998

[54] MEDICAL IMAGE ARCHIVING WITH LOSSY IMAGES ON TWO OR MORE RECORDABLE CDS

[75] Inventors: Geraldine Ann Pelanek, Webster; Paul B. Condit, Pittsford, both of N.Y.

[73] Assignee: Eastman Kodak Company, Rochester, N.Y.

[21] Appl. No.: 250,140

[22] Filed: May 27, 1994

[51] Int. Cl.⁶ .................................................. G46F 17/60
[52] U.S. Cl. .................... 395/620; 382/232; 382/244; 382/305
[58] Field of Search .............................. 364/413.13

[56] References Cited

U.S. PATENT DOCUMENTS

| | | | |
|---|---|---|---|
| 4,768,099 | 8/1988 | Mukai | 358/257 |
| 5,001,569 | 3/1991 | Shigyo | 358/296 |
| 5,015,854 | 5/1991 | Shigyo et al. | 250/327.2 |
| 5,019,975 | 5/1991 | Mukai | 364/413.3 |

FOREIGN PATENT DOCUMENTS 9205504  4/1992  WIPO.

OTHER PUBLICATIONS

Gillespy and Rowberg, "Images on Personal Computers" Journal of Digital Imaging vol. 6, No. 4, Nov. 1993.
Narayan and Ramabadran, "Hybrid Lossless-Lossy Compression of Industrial Radiographs", review of progress in quantitative nondestructive evaluation, vol. 11A Proceeding of the 18th Annual Review Aug. 2, 1991.
"The JPEG Still Picture Compression Standard", by Gregory K. Wallace, Communication of the ACM, Apr. 1991, vol. 4, No. 4, pp. 30–44.

*Primary Examiner*—Robert A. Weinhardt
*Assistant Examiner*—William N. Hughet
*Attorney, Agent, or Firm*—William F. Noval

[57] ABSTRACT

A transportable medical image storage medium includes a recordable optical compact disk. The compact disk has a first storage area which records a plurality of substantially losslessly compressed digital medical images and a second storage area which records a plurality of lossy compressed digital medical images corresponding to said losslessly compressed medical images. Where a case study or set of medical images is of such a length that more than one CD is required to record all of the losslessly compressed digital medical images, each CD records the entire set of lossy compressed digital medical images.

12 Claims, 3 Drawing Sheets

MEDICAL IMAGE ARCHIVING WITH LOSSY IMAGES ON TWO OR MORE RECORDABLE CDS

FIELD OF INVENTION

This invention relates in general to a medical image storage system and more particularly relates to a transportable medical image storage medium, including a recordable compact optical disk (generally referred to as CD-R) having recorded thereon a plurality of losslessly compressed and corresponding lossy compressed medical images. When a case study includes the recording of losslessly compressed medical images on two or more CDs, the entire case study is recorded on each CD as lossy compressed medical images.

BACKGROUND OF THE INVENTION

In traditional film screen radiography, an x-ray image of an object, such as an anatomical part of a patient, is formed in film. The film is then processed to produce a developed x-ray film image. Storage of and/or display of multiple x-ray film images from a patient study is space intensive, inconvenient and expensive. With the advent of digital image diagnostic scanner equipment, such as CT and MRI scanners, digital radiographic images have become commonplace. Digital images have several advantages over film images. They can be stored in compact magnetic or optical media. They can be displayed on a display device, such as a video monitor. They can also be processed to optimize various characteristics of the digital radiographic image.

Digital radiographic images can also be produced by means of computed radiography techniques. The following U.S. patents disclose the storage in an optical disk media of digital images produced by computed radiography: U.S. Pat. No. 4,768,099, issued Aug. 30, 1988, inventor Mukai; U.S. Pat. No. 5,001,569, issued Mar. 19, 1991, inventor Shigyo; U.S. Pat. No. 5,019,975, issued May 28, 1991, inventor Mukai. It is disclosed in these patents that the image signals recorded on the optical disk are subjected to an image compression technique before recording. There is no disclosure in these patents, however, of recording both lossy and lossless radiographic images on the same optical disk. U.S. Pat. No. 5,015,854, issued May 14, 1991, inventors Shigyo et al., discloses a radiation image display apparatus having a magnetic hard drive which stores both uncompressed image signals and a condensed image signal which represents an outline of the uncompressed radiation image. There is no disclosure in this patent, however, of storing the uncompressed and compressed radiation image signals on a recordable optical compact disk.

Cardiac x-ray angiography with the aid of x-ray absorbing contrast media, images the arteries which supply blood to the heart muscle tissue. Restrictions in blood flow (stenoses) cause insufficient blood supply and hence oxygen deprivation of the muscle tissue. The partial lack of oxygen will cause chest pain (angina), while a nearly total lack of blood flow will cause a heart attack (myocardial infarction) during which the muscle tissue dies and the performance of the heart either diminishes or ceases to function and the individual dies. Since the arteries of interest wrap around the outside of the heart, and the heart is constantly in motion, to adequately image these vessels the x-ray exposure and image capture must be obtained from numerous anatomical projections and be captured with real time motion imaging (approximately 30 images/sec) at high spatial resolutions. All of this leads to large amounts of digital data. An average diagnostic procedure is 2000 images. Depending upon the image acquisition matrix, the average procedure generates between 500 Megabytes (MB) and 2 Gigabytes (GB) of digital data. Imaging during an interventional procedure can cause the amount of digital data to double.

The most common method today to record cardiac catheterization images are in analog form on specialized 35 mm black and white cine film. However, there is a strong desire to archive the digitally generated images on a cost effective medium as the official record of the procedure and for future review as well. To use digital storage media more efficiently, the data can be mathematically compressed in a way that is totally reversible (lossless compression). To subsequently view the images, the clinician needs to see the images in real time motion and at slower speeds as well. The clinician also wants to randomly access rather than just sequentially access the images. Presently, there is no digital archive medium which can meet the following requirements: data transfer rates fast enough to provide real time motion display of losslessly compressed images and random data access. Therefore, the only available options to provide random access and real time motion display are, either to transfer the data from a slower inexpensive archive medium onto a faster more expensive buffer medium, or to have stored the data at a higher lossy compression so that the data transfer rate of the inexpensive archive medium is fast enough to support real time motion display.

Clinicians have expressed a strong preference to avoid the required delay time while the digital data is transferred from the archive medium to the fast buffer medium. Eigen (Nevada City, Calif.) introduced a product which stores the digital cardiac image data on a magneto-optical disk in two forms. One form is a lossless compression, the other is a lossy compression which supports higher speed motion display. The Eigen review product allows the clinician to review images in motion utilizing the lossy compressed data and if the user stops for a still image the lossless compression data corresponding to the still image will be utilized. If the procedure is long (or if the acquisition matrix is large), the amount of digital data to be archived for the procedure exceeds the capacity of a single magneto-optical disk, requiring the data to be split over multiple disks. Therefore if one of the disks should get lost, the vital record of the procedure would be incomplete.

Using a magneto-optical disk to archive the images as a replacement for cine film has two distinct disadvantages, however. Firstly, cine film is an unalterable record of the procedure, whereas a magneto-optical disk is a re-writable medium permitting intentional or accidental changes to the permanent record of the procedure. Secondly, magneto-optical media violates the desire for a cost effective replacement for cine film. To archive an average procedure on a magneto-optical disk will cost about three times more than archiving the images on cine film.

SUMMARY OF THE INVENTION

According to the present invention, there is provided a solution to the problems of the prior art. According to an aspect of the present invention, medical image data is archived on a recordable optical compact disk. The medical image data is stored on the compact disk in two forms: losslessly compressed image data and corresponding lossy compressed image data. Where the medical image data exceeds the capacity of a single disk, the entire set of medical images is recorded as lossy compressed medical images on each disk of the plurality of disks which record the set of medical images as substantially losslessly compressed medical images.

According to another feature of the present invention, there is provided a transportable medical image storage medium comprising: a recordable optical compact disk; a first storage area of said recordable optical compact disk upon which are recorded a plurality of losslessly compressed digital medical images; and a second storage area of said recordable optical compact disk upon which are recorded a plurality of lossy compressed digital medical images corresponding to said losslessly compressed medical images. When two or more recordable optical compact disks are used to record all of the losslessly compressed digital medical images of a set of medical images, each CD has recorded on it a complete set of lossy compressed digital medical images.

The present invention has the following advantages:

a) The data is recorded on CD in at least two forms; one permits real time viewing of the images (lossy compression) while the other is the data preserved as the original (lossless compression). Either of these data forms are accessible.

b) Once the data are recorded onto the CD, that data cannot be either accidentally or intentionally modified since it is not a re-writable medium like magneto-optical disc is.

c) Since the CD can be recorded with ISO 9660 logical file structures, the CD files can be recognized by almost any common personal computer platform. This is unlike the magneto-optical disc, which does not have similar standards.

d) The recordable CD (CD-R) medium is presently equal to or less than the cost of cine film.

e) Using CD format optical medium provides a record with one patient record per CD, similar to today where there is only one patient's images on cine film. A single patient's record could be stored on large (physical) format media, however this would not be cost effective.

f) The physical nature of the CD-R medium and the format in which the data is encoded and written to the CD provides more robust storage of the archived data than other forms of optical media (including magneto-optical). This makes it possible to retrieve data from a CD which has scratches, dirt, etc. and not retrieve data from other optical storage media with comparable physical abuse.

g) If one or more disks of a set are lost, the entire procedure or set of medical images is still preserved in its entirety.

h) The clinician is only required to handle/manipulate only one disk in order to view the images from the entire procedure, which is more efficient use of time.

i) The original data are still available for review of the losslessly archived images.

DESCRIPTION OF THE PREFERRED EMBODIMENTS

According to the present invention, there is provided a technique for recording medical images, and, more particularly, x-ray cardiology angiography images on a recordable optical compact disk. The recorded image data is compressed in two different ways: one is a lossy or irreversible compression and the other is a lossless or reversible compression. The lossy compression results in lost data. However, it should appear on a video display as nearly visually lossless. The lossless compressed digital data is compressed much less than the lossy compression and allows restoration of the image to its full original acquisitioned resolution. Lossless compression ratios are generally in the range of 1.5:1 to 4.0:1, whereas lossy compression ratios can be much higher, e.g., 6:1 and up.

Figure 2:
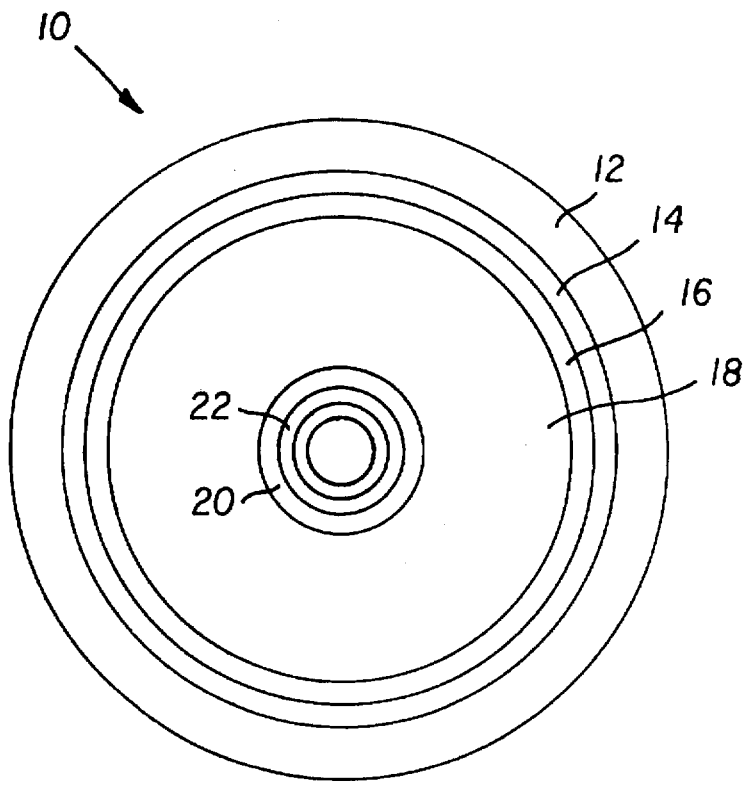
FIG. 2 is a diagrammatic view of an embodiment of record once compact disk.

As shown in FIG. 2, the recordable optical compact disk 10 is formatted to have the following regions: a handling zone 12 (which is empty); a leadout region 14; a region 16 for storing the file directory; a region 18 where losslessly compressed digital image data is stored; a region 20 where the lossy compressed digital image data is stored; and a region 22 where header information is stored. Preferably, the header information contains the appropriate information to comply with ISO 9660 formats. The ISO 9660 compliance will enable multiple computer platforms (IBM compatible PC's, Macintosh, Sun, etc.) to recognize files on the CD.

The recordable optical compact disk or CD-R is a compact disk medium that can be recorded on once, but which, once recorded on, is not erasable. The compact disk may be recorded on in unrecorded regions at different times. The medium is compact, transportable, cost effective, and reliable.

According to the present invention, if the number of losslessly compressed digital medical images constituting a set or case study, exceeds the capacity of a single CD, an entire set of lossy compressed digital medical images will be recorded on each CD of the plurality of CDs which record the case study. Thus, the lossy data is identical on each CD, while the lossless data is appropriately split between the multiple CDs.

Figure 5:
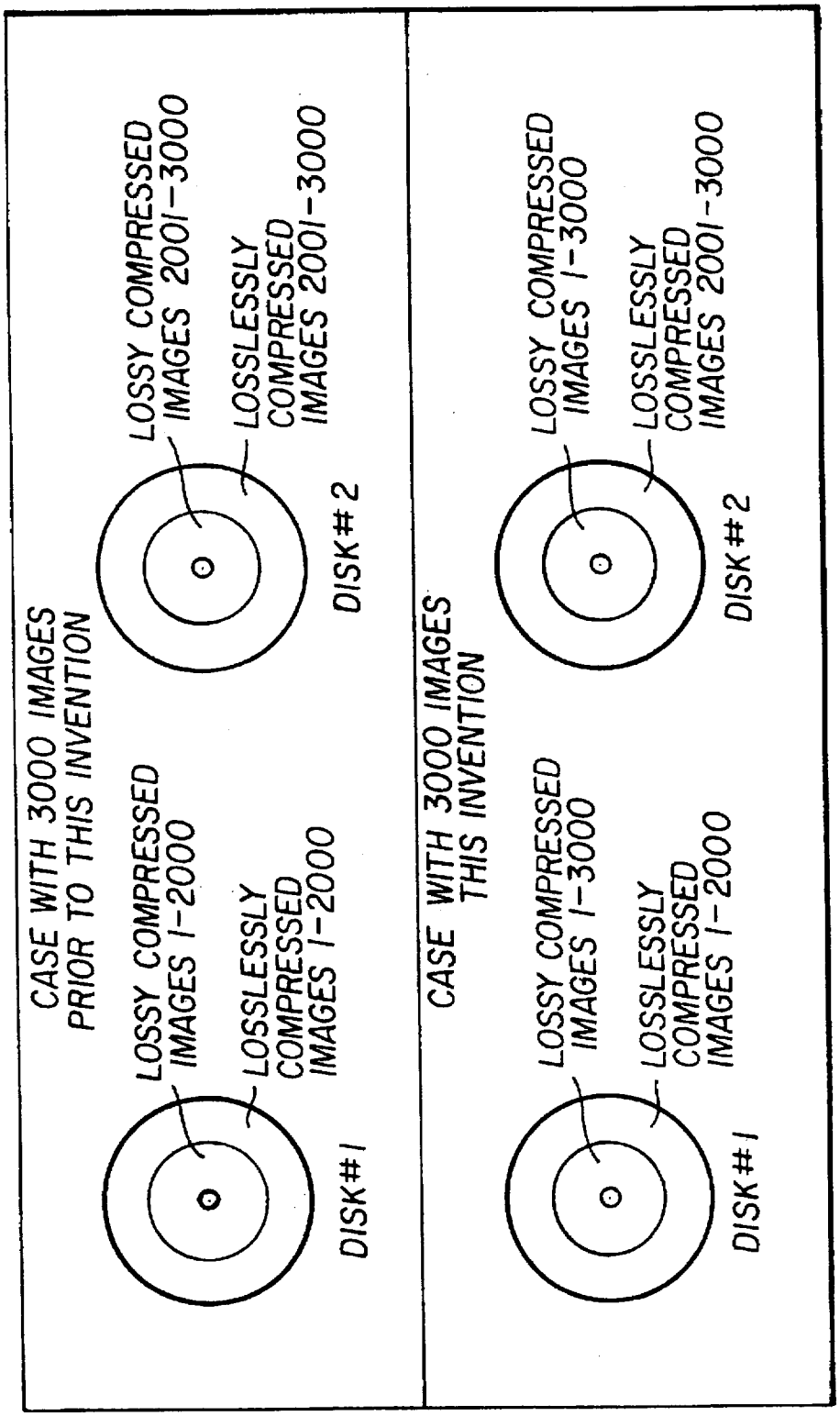
FIG. 5 is a diagrammatic view useful in explaining the present invention.

As an example, it is assumed that the case study was 3000 images long. The first CD would contain the data from the lossy compression of image numbers 1–3000 and the lossless compression data of images 1–200 (where, for example, the CD capacity is up to 2000 losslessly compressed images). The second CD would contain the data from the lossy compression of image numbers 1–3000 and the lossless compression data of images 2001–3000. This example is illustrated in FIG. 5.

The formatting process preferably writes to the CD a volume identifier which distinguishes whether the complete case study is stored on a single or multiple CDs. If multiple CDs must be utilized, the volumes must have an identifier indicating sequence. As an example, volume number =0 indicates only a single CD is used for a case study, volume numbers=1, 2, 3, etc. indicates multiple volumes and its relative sequence. There should also be an indicator of the total number of volumes in a case study. For example: volume 2–5 could indicate that the CD is volume 2 of 5 volumes. Other indicator formats can also be used.

Figure 1:
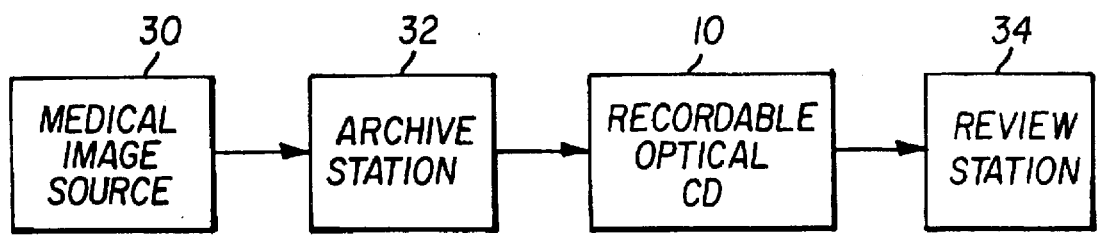
FIG. 1 is a block diagram of a medical image archiving and review system.

The recordable optical compact disk 10 of FIG. 2 can be used in a digital archiving and review system alternative to 35 mm cine film and associated equipment (cine cameras, processors and projectors). Although a cardiology imaging system will be described hereinafter, it will be understood that other medical imaging archiving and review system applications are contemplated for use with the recordable optical compact disk of the present invention. As shown in FIG. 1, a cardiology motion image source 30 provides digital images to an archive station 32 where the images are recorded on one or more recordable optical compact disks 10. The recordable optical CD 10 can then be viewed on a review station 34.

Figure 3:
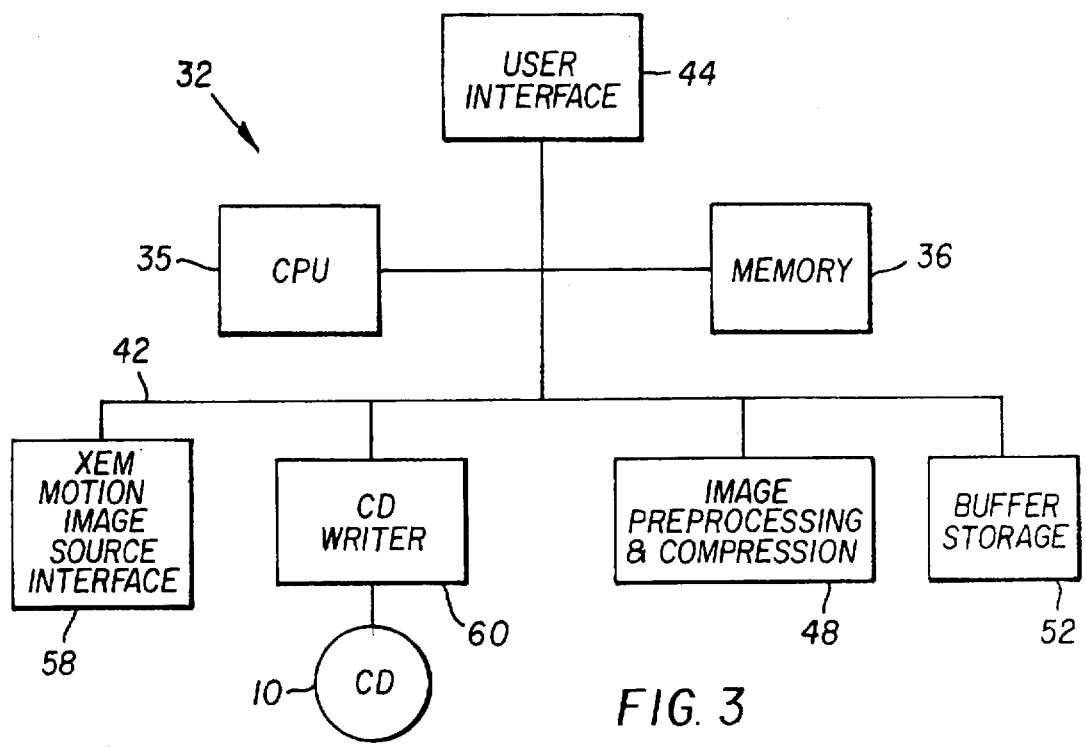
FIG. 3 is a block diagram of an archiving station of the system of FIG. 1.

Referring now to FIG. 3, there is shown a block diagram of an archive station 32 for receiving cardiology images and recording them on a recordable optical compact disk 10. As shown, archive station 32 includes, a central processing unit (CPU) 35, internal memory 36, and a user input device linked to a bus 42. Bus 42 is linked to image pre-processing and compression board 48, and a buffer storage 52. Connected to bus 42 is an XEM (X-ray equipment manufacturer) motion image source interface 58, and a CD writer 60. CD writer 60 is a recordable optical disk writer, such as supplied by the Eastman Kodak Company, Rochester, N.Y., as the Kodak PCD Writer 600. The compression board is preferably based on the Joint Photographic Experts Group (JPEG) international digital image compression standard for continuous tone still images. A general overview of this standard is presented in the article entitled "The JPEG Still Picture Compression Standard", by Gregory K. Wallace, Communication of the ACM, April 1991, volume 4, No. 4, pages 30–44. It will be understood that other compression techniques can also be used within the scope of the present invention.

The operation of archive station 32 is as follows:

In general, during the cardiac catheterization case study, the images are stored in the x-ray equipment manufacturer's (XEM's) digital acquisition memory. The entire case's data will be transferred to the archive station 32. Once data is stored in station 32, the XEM memory is free to acquire a new patient's images. The image data is received from the XEM memory by interface board 58. The image data is compressed two different ways in compression board 48: there is a lossy compression and a lossless (e.g., 2:1) compression. The lossy compression results in lost data. However, it should appear as nearly visually lossless upon display. The 2:1 compression is lossless and allows restoration of the image to its full original acquisition resolution. The lossless and lossy compressed image data is stored in buffer storage 52. The user enters the patient's name, ID number, etc., into the archive station 32 by user input device 44, if this information cannot be supplied via the XEM motion image source interface 58. This information is merged with the image data and written by CD writer 60 to the CD 10. This feature allows the elimination of preparing the lead letters and the identification x-ray exposure. Part of this information will be included in the header information written to the CD 10 as well as the file directory of the CD 10 contents.

A typical cardiology motion image source produces 30 digital images per second. Each digital image can have a format of 512×512 pixel array, or a 1024×512 pixel array, with a pixel depth of 8 bits. If a typical patient case study includes 2000 images, a single Recordable CD can be used to record the case study (assuming lossy compression of 6+:1 and lossless compression of 2:1).

Because of the probable need to accept new data from the user's lab while the previous patient's data has not been completely archived, buffer storage 52 has the capacity to hold a minimum of two long patient study cases.

Currently available 63 minute record once CDs 10 have a maximum capacity of 580 Megabytes. The total capacity is not just data, but must include the data plus the ISO 9660 file structures, etc. Greater capacity record once CDs should be physically interchangeable with current record once CDs.

If the cath case exceeds the capacity of a single CD 10, the lossy compressed track will contain the images of the entire case and is identical on each CD 10. The lossless data is appropriately split between the multiple CDs 10.

Review Station

Figure 4:
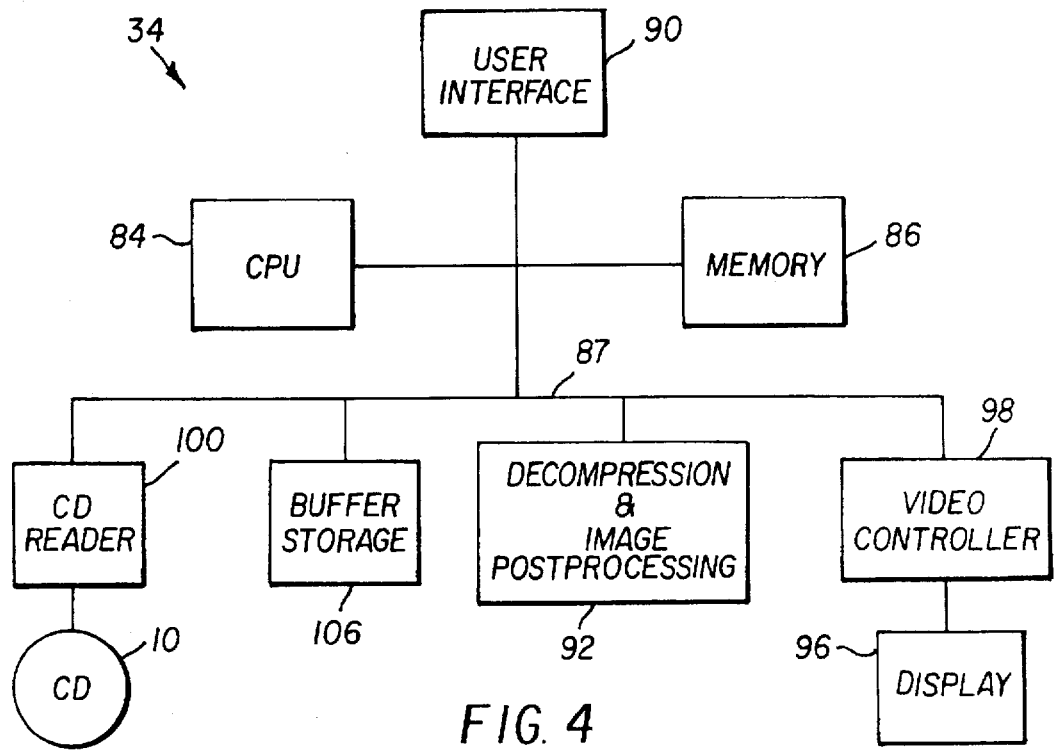
FIG. 4 is a block diagram of a review station of the system of FIG. 1.

A review station 34 for displaying the images of a medical image study recorded on a recordable CD 10 is shown in FIG. 4. As shown, review station 34 includes a user interface 90, a central processing unit (CPU) 84, and memory 86 connected to bus 87. Also connected to bus 87 is an image decompression and post-processing board 92, and video display 96 byway of video controller 98. Review station 34 includes, a CD reader 100, and buffer storage 106 connected to bus 87.

In general, review station 34 operates as follows: A CD 10 is loaded into CD reader 100. Reader 100 produces sequential images of the medical image study. The images are stored in buffer storage 106. Images which are read out of buffer storage 106 are decompressed and processed by board 92. The images are displayed on display 96 byway of video controller 98.

Once the medical image case is stored onto CD 10 by archive station 32, it is available for immediate review on review station 34 (FIG. 4). The user selects through user interface 90 the desired CD 10 for viewing and the desired review mode. The reader 100 reads the CDs 10 data compression format to determine the appropriate image decompression factors. The file directory is read from the CD 10 into memory 86 and the review station 34 is ready to begin displaying images on display 96.

The need for palindrome capability (viewing motion both forward and reverse) has led to two operational modes for review station 34; one of which can offer full palindrome viewing if the system is restricted to utilizing the lossy data. Furthermore, the user only has to load one of the potentially multiple CDs 10 used to archive the case, since each CD contains identical lossy compression data of the entire case. The other mode will not provide reverse viewing, but will allow the user to back up and repeat viewing forward motion while maintaining the ability to access the lossless data for slow speed or still viewing. This mode of operation will require the user to load all CDs 10 involved in archiving the case.

Although the higher compression image data has lost data from the original image data, its compression will produce nearly visually lossless images. Cardiologists have consistently expressed a reluctance to wait for digital image records to be transferred and loaded into memory for real-time viewing. This concern is obviated by having the lossy compressed images available for real-time viewing (and also slow/still speeds depending upon the mode of operation) while the lossless images are available for detailed study of the images at slow or still speeds. The user can switch rapidly between any of the speeds: real-time, slow or still images.

Review Station Modes of Operation

MODE A

If the user selects Mode A, only the lossy data will be utilized for any speed between still and real time motion. As the lossy compressed data is read from the CD 10 it is loaded into the buffer storage 106 which will act as a buffer to compensate for the variable amount of compressed data on a frame to frame basis. After a suitable amount of data has been buffered that will allow sustained display rates, the data is sent to the decompression board 92 for image display on display 96. When the user switches to reverse viewing, the compressed data will be read in "reverse" from buffer storage 106 and sent to the decompression board 92 for processing. Via either data direction path, the decompressed data is then processed for display 96.

MODE B

If the user selects Mode B, both the lossy and lossless data will be utilized for image display on display 96. Obviously, if the patient case was archived with multiple CDs 10, potentially the user must load all the cases CDs 10. The lossy data will be used for viewing images in forward motion at speeds > the threshold speed through real time motion. For images viewed still, single advance or less than the threshold speed, the lossless data will be obtained from the CD 10 for decompression by decompression board 92. The threshold speed is a function of the data transfer rate of the CD reader 100 used and the amount of data per image. The amount of data per image is primarily a function of the data acquisition/archive matrix.

Since the user can interactively switch between the lossy and lossless data, the scheme of loading the compressed data into buffer storage 106 and reading it in reverse will not work as the reverse viewing of the lossy/lossless data image mixture would not permit sustained viewing speeds and this would be very annoying to the user. Therefore, true palindrome viewing cannot be provided when operating in this mode. To repeat viewing a sequence of images, the user may "jump back" a specific number of images and once again view images in forward motion. Depending upon frames to be viewed and the speed selected for reverse viewing of images, the user may experience a time delay as the appropriate data (lossy or lossless) may have to be first read off the CD 10. In Mode B, motion is limited to the forward direction only.

Although the invention has been described specifically in relation to the archive and review of cardiology images produced during a catheterization study of a patient by angiography x-ray imaging, it will be understood that the present invention includes the recording of other types of medical images in both lossy compressed and losslessly compressed image data on a record once optical compact disk. Thus, the medical images can be received from any number of diagnostic imaging modalities (such as, MRI, US, CT, PET, NM, etc.); digital radiography (such as storage phosphor systems); still and cine radiographic film digitizers; and the like. It will also be understood that image compression techniques other than JPEG can be used to produce the lossy and lossless compressed image data recorded on the record once optical compact disk of the present invention.

What is claimed is:

1. A medical image storage system for storing a set of digital medical images comprising:

at least first and second separate and transportable digital storage media;

each of said at least first and second digital storage media having a first storage area of said medium which stores losslessly compressed digital medical images; and a second storage area of said medium which stores lossy compressed medical images corresponding to said losslessly compressed digital medical images;

wherein said at least first and second digital storage media store a set of digital medical images, such that an entire set of lossy compressed digital medical images are stored in the second storage area of each of said at least first and second digital storage media, and wherein the storage of said set of losslessly compressed digital medical images is split between the first storage areas of said at least first and second digital storage media.

2. The system of claim 1 wherein each said first storage area is separate from each said second storage area on said digital storage medium.

3. The system of claim 1 including a third storage area on each said digital storage medium which includes a file directory of stored images.

4. The system of claim 1 including a fourth storage area on each said digital storage medium which includes header data, such as, logical file structures.

5. The system of claim 4 wherein said header data conforms to the ISO (International Standards Organization) 9660 format.

6. The system of claim 1 wherein said digital medical images stored on said digital storage media are cardiology images.

7. The system of claim 1 wherein said digital medical images stored on said digital storage media are a sequence of motion cardiology images.

8. The system of claim 7 wherein said sequence of motion cardiology images stored on said digital storage media are from a single patient case study.

9. The system of claim 1 wherein each of said digital storage media includes a volume identifier indicating media sequence.

10. The system of claim 9 wherein said volume identifier also includes an indicator of the total number of volumes (media) recording said complete set of medical images.

11. The system of claim 1 wherein said first and second storage media comprise optical digital disks.

12. The medical image storage system of claim 11 wherein said optical digital disks comprise recordable optical compact disks.

* * * * *